July 14, 1942.   H. J. CRINER   2,289,630
BREAD SLICING MACHINE
Filed April 28, 1941
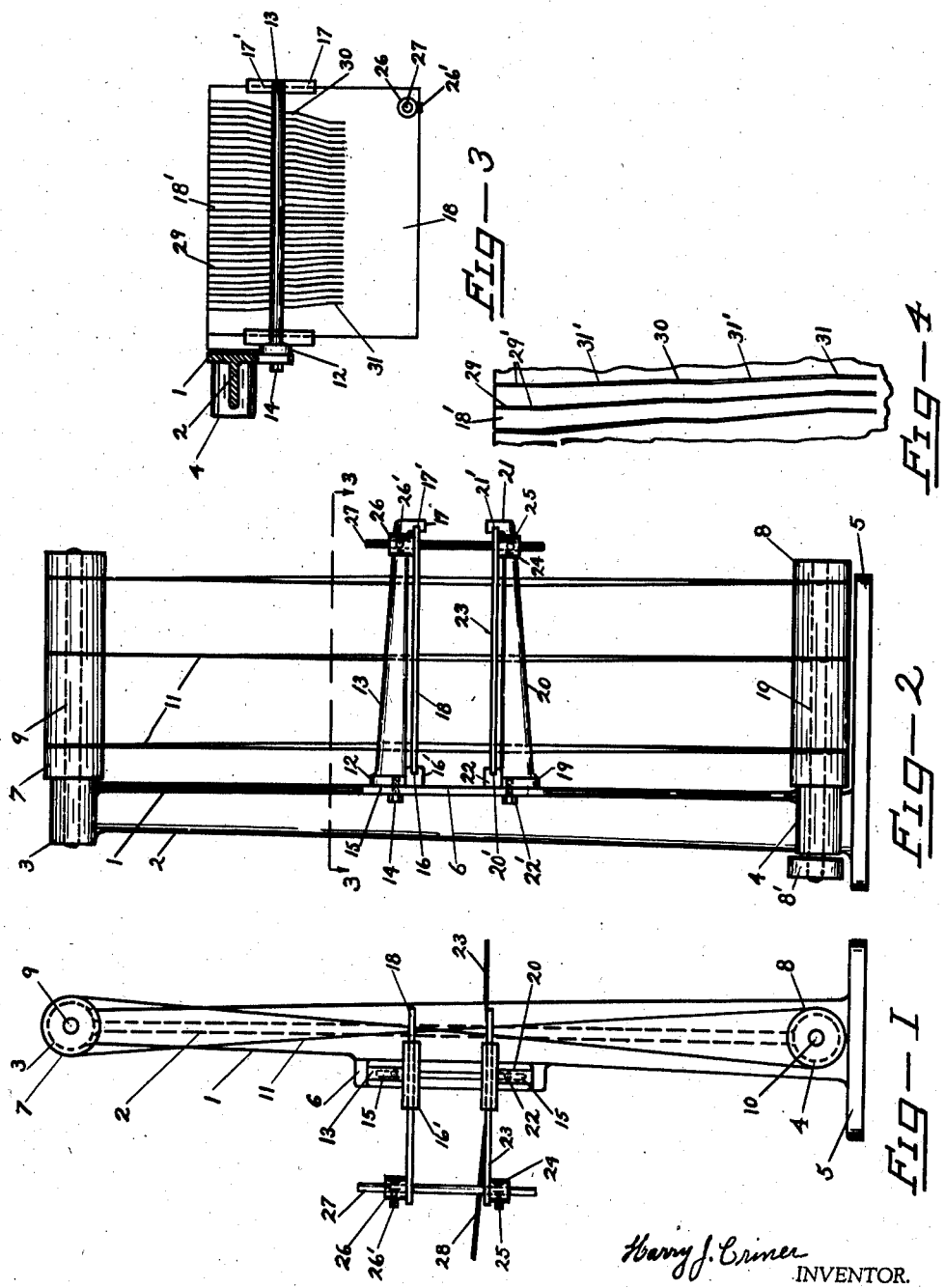
Harry J. Criner INVENTOR.

Patented July 14, 1942

2,289,630

UNITED STATES PATENT OFFICE 2,289,630

BREAD SLICING MACHINE

Harry J. Criner, Davenport, Iowa, assignor of one-half to A. G. Bush, Davenport, Iowa Application April 28, 1941, Serial No. 390,767

9 Claims. (Cl. 146—88)

My invention relates to improvements in bread slicing machines.

The objects of my invention are to provide a multiple-bladed bread slicing machine having longitudinally adjustable guide plates to simultaneously change the spacing of the blades, and to support and guide the bread while being sliced; to provide means for readily retracting the guides so as to clear the blades to take off or put on bands; to provide improved means for separately adjusting the guides vertically both relative to the frame and to each other to center the loaves of bread approximately at the crossing point of the blades; to provide guide assemblies movable forward or backward to change the spacing of the blades; to provide stepped diagonal guide slots of varying pitch whereby the blades may be uniformly spaced at predetermined distances to cut different thicknesses of slices.

I attain these objects by the means illustrated in the accompanying drawing, in which:

Figure 1 is a side elevation of one form of my invention;

Figure 2 is a rear elevation, but with the feed and discharge bread chutes omitted;

Figure 3 is a sectional detail of the upper guide assembly on the line 3—3 of Figure 2;

Figure 4 is an enlarged detail of part of one of the slotted guide plates.

Similar numerals refer to similar parts throughout the several views.

My frame consists of a base 5 extending far enough to insure a firm support for the machine, and cast integral with a column preferably T-shaped in section and comprising a flange 1 and web 2.

A boss 4 is formed integral with the lower end of the column and an upper boss 3 is formed integral with the upper end of it.

Revolvably mounted in the boss 4 is a shaft 10 on the outer end of which a pulley 8' is mounted and which may be driven by a belt or other means as desired.

In the upper boss 3 a corresponding shaft 9 is mounted. Upon the shafts 9 and 10 I mount cylindrical pulleys 8 and 7 respectively, which carry a plurality of endless band-blades 11, the bands being driven by pulley 8 and in turn driving the pulley 7. These bands are preferably mounted upon the pulleys in figure 8 form as shown in Figure 1, but it is obvious that my invention can be applied to band-blade machines utilizing uncrossed cutting bands and may also be applied to reciprocating blade machines of either the crossed or uncrossed type.

In band-blade machines of the crossed blade type there is a tendency for the blades, if unguided, to travel in a direct line from pulley to pulley and to rub together at their crossing point. I avoid this by running the front cutting course of a given blade in a guide slot as 29 and the back cutting course of the same blade in the next succeeding guide slot, thus spreading them apart the proper distance for cutting slices of a given thickness.

In the simplest form of my invention, a bracket 6 is formed integral with the web 1 of column having a longitudinal slot 15 to receive cap screws or bolts 14 and 22. An upper guide support comprising an arm 13 and a foot 12 cast integral therewith, has a tapped hole to receive a cap screw 14 to secure the upper guide plate support at different vertically adjusted positions. Integral with the arm 13 and foot 12 are grooved lugs having guide members 16' and 17 with grooves 17' and 16. A blade guide plate 18 is mounted in said grooves and is slidably adjustable therein.

A lower guide support, having an arm 20 and a foot 19 cast integral therewith, is adjustably mounted in the bracket 6 and has a tapped hole to receive the cap screw 22' to secure said guide support at different adjusted positions. Lugs 21 and 22 are provided with grooves 20' and 21' in which a lower blade guide plate 23 is adjustably mounted and in which it may be moved longitudinally by hand or mechanical means.

The blade guide plates 18 and 23 may be made of steel, alloys, plastics or other suitable material. Bosses 24 and 26 are united to the guide plates 18 and 23 with bores extending through them and through guide plates 18 and 23. A shaft 27 is inserted in the bosses and set screws 25 and 26' hold the shaft in place after being adjusted to the desired height. The shaft 27 may be used for sliding the guide plates 18 and 23 forward or backward to change the gauge of the blades 11.

The blade guide plates 18 and 23 have a plurality of longitudinal slots 29 to receive the blades 11. The inner ends of the slots 29 are uniformly spaced at a distance apart equal to the minimum thickness of the desired slices of bread and then diverge outwardly to a spacing equal to the desired maximum thickness of the bread slices.

Each slot has a number of short longitudinally parallel courses in which the blades will be held at right angles to the axes of their pulleys while the slicing operation is going on as shown at 29', 30 and 31 in Figure 4. For ordinary purposes three of these cutting positions will be enough, as the present standard thicknesses for slices are ⅜", ½" and ⅝".

Each band-blade above and below the crossing point of the bands will run in the longitudinal sections of the slots when cutting bread. To change from one to another spacing, the guide plates 18 and 23 are moved forward or backward to the desired point whereby the band-blades 11 in the slots 29 are guided from one desired spacing to another.

In the operation of my machine, the cutting bands are driven by the pulley 8' by means of power applied to same.

The guide assemblies for the cutting bands are adjusted to the proper level by the appliances heretofore described and power applied. The lower guide plate may be utilized as a feed table to carry the bread as brought to it by the feed chute 28. As the bread travels over the lower guide assembly, the upper guide assembly will be adjusted to contact lightly therewith and may be sufficiently flexible to conform to the ordinary variation in the height of the loaves.

When desired to run a batch of loaves of a different size, the guide plates may be adjusted to the necessary vertical positions to center the loaves at the crossing point of the blades.

It will be apparent from the description heretofore given that my invention performs several important functions. It affords means for guiding the blades, so as to provide an even inclination of the blades as they approach and leave the cylindrical pulleys.

It affords simple means for adjusting the height of both the upper and lower guide assemblies so as to properly center the loaves of bread at the crossing point of the blades or for adjusting the upper assembly alone. It affords means for withdrawing the guide plates from the cutting blades quickly and forcibly when it is desired to remove or to put on a blade or blades. It affords means to change the spacing between the blades progressively and for such changes to take place in opposite directions from the center slot as shown in Figure 3 by moving the guide assemblies forward or backward.

While I have shown a plate slotted to leave intervening fingers, it is obvious that spaced rods bent to the same form and properly supported, may be substituted for my fingers and will guide the blades in the same way.

It is obvious also that many changes may be made in the apparatus described without departing from the spirit of my invention and I do not limit my claims to the precise forms shown in the drawing.

It is also obvious that my invention may be applied to reciprocating blade machines either of the parallel or the crossed blade type, and I do not confine my claims to band-blade machines.

While I have shown a frame comprising a single column with suitable base, to carry the pulleys, it is obvious that the frame may be formed with two columns or with two suitable side plates at opposite ends of the pulleys, in accordance with the present common practice, without departing from the spirit of my invention. I do not limit my claims to any particular form of frame.

I claim:

1. In a bread slicing machine, the combination with a plurality of crossed band-blades, of supporting and driving pulleys therefor, a pair of spaced slotted guide plates disposed intermediate said pulleys to guide the reaches of the crossed blades at opposite sides of their slicing zones and including longitudinally inclined slots having a plurality of progressively stepped sections parallel with the line of travel of the bread, to receive and adjust said blades laterally toward or away from each other at uniform distances apart.

2. In a bread slicing machine, the combination with a plurality of crossed band-blades, of supporting and driving pulleys therefor, a pair of spaced slotted guide plates disposed intermediate said pulleys to guide the reaches of the crossed blades at opposite sides of their slicing zones and including longitudinally inclined slots having a plurality of progressively stepped sections parallel with the line of travel of the bread, to receive and adjust said blades laterally toward or away from each other at uniform distances apart, and means to simultaneously adjust the guide plates longitudinally.

3. In a bread slicing machine, the combination with a plurality of crossed band-blades, of supporting and driving pulleys therefor, a pair of spaced slotted guide plates disposed intermediate said pulleys to guide the reaches of the crossed blades at opposite sides of their slicing zones and including longitudinally inclined slots having a plurality of progressively stepped sections parallel with the line of travel of the bread, to receive and adjust said blades laterally toward or away from each other at uniform distances apart, and means to simultaneously adjust the guide plates longitudinally while the pulleys are in motion, said pulleys being common to the several band-blades, whereby said blades automatically adjust themselves thereon with the adjustment of the guide plates.

4. In a bread slicing machine, a blade spacing guiding apparatus, comprising a longitudinally adjustable plate mounted thereon having a plurality of inclined longitudinal slots arranged in series with a plurality of progressively spaced parallel sets of sections in said slots arranged to receive and guide the blades in their cutting courses each set of sections being spaced differently than the preceding and following sets.

5. In a bread slicing machine, a blade spacing and guiding apparatus, comprising a longitudinally adjustable plate mounted thereon having a plurality of substantially longitudinal slots arranged in series with a plurality of progressively spaced parallel sections in said slots arranged to receive and guide the blades in their cutting courses at uniformly spaced distances from each other when in any given series of said parallel sections, said slots having angular sections intervening between the parallel sections, and the successive angular intervening sections being arranged at progressively increasing angles from the middle of the series of slots outwardly toward each side.

6. In a bread slicing machine, a blade spacing and guiding apparatus, comprising a longitudinally adjustable plate mounted thereon having a plurality of substantially longitudinal slots arranged in series with a plurality of progressively spaced parallel sections in said slots arranged to receive and guide the blades in their cutting courses at uniformly spaced distances from each other when in any given series of said parallel sections, said slots having angular sections intervening between the parallel sections, and the successive angular intervening sections being arranged at progressively increasing angles from one part of the plate to the other parts thereof.

7. In a bread slicing machine, a blade spacing and guiding apparatus, comprising a vertically adjustable plate mounted thereon having a plurality of substantially longitudinal slots arranged in series with a plurality of progressively spaced parallel sets of sections in said slots arranged to receive and guide the blades in their cutting courses each set of sections being spaced differently than the preceding and following sets.

8. In a bread slicing machine, a blade spacing and guiding apparatus, comprising a pair of longitudinally adjustable plates mounted thereon each having a plurality of substantially longitudinal slots arranged in series with a plurality of progressively spaced parallel sets of sections in said slots arranged to receive and guide the blades in their cutting courses, said plates being adjustable vertically and each set of sections being spaced differently than the preceding and following sets.

9. In a bread slicing machine, a blade spacing and guiding apparatus, comprising a longitudinally adjustable support carrying a plurality of fingers having narrow spaces between them arranged in series, with a plurality of sets of differently spaced parallel portions in said spaces arranged to receive and guide the blades in their cutting courses and each set of parallel spaces being spaced differently than the preceding and following set.

HARRY J. CRINER.